US012406072B2

(12) United States Patent
Chan et al.

(10) Patent No.: US 12,406,072 B2
(45) Date of Patent: Sep. 2, 2025

(54) CODE-CHANGE BASED PROMPT FOR CODE REPAIR

(71) Applicant: MICROSOFT TECHNOLOGY LICENSING, LLC., Redmond, WA (US)

(72) Inventors: Aaron Yue-Chiu Chan, Provo, UT (US); Anant Kharkar, Huntersville, NC (US); Yevhen Mohylevskyy, Redmond, WA (US); Kalpathy Sitaraman Sivaraman, Redmond, WA (US); Neelakantan Sundaresan, Bellevue, WA (US); Roshanak Zilouchian Moghaddam, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 150 days.

(21) Appl. No.: 18/205,470

(22) Filed: Jun. 2, 2023

(65) Prior Publication Data

US 2024/0403438 A1    Dec. 5, 2024

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 11,650,905 | B2* | 5/2023 | Sharma | G06F 11/3604 726/25 |
| 2024/0184570 | A1* | 6/2024 | Fu | G06N 3/0895 |
| 2024/0248686 | A1* | 7/2024 | Garg | G06F 8/36 |
| 2024/0311582 | A1* | 9/2024 | Schaefer | G06F 11/3608 |

OTHER PUBLICATIONS

Matthew Jin, InferFix: End-to-End Program Repair with LLMs over Retrieval-Augmented Prompts (Year: 2017).*
International Search Report and Written Opinion received for PCT Application No. PCT/US2024/030688, mailed on Sep. 25, 2024, 14 pages.

* cited by examiner

*Primary Examiner* — Syed A Roni (57) ABSTRACT

A source code repair system generates a prompt including a few-shot examples of code changes made previously to correct a particular source code vulnerability. The prompt is given to a large language model to generate repair code for a source code snippet having the same vulnerability. Code changes made for a particular source code vulnerability, in the form of code diffs, are clustered into groups of closely related code change embeddings. A select few of the code diffs in each group having a closest mean of the cluster are used as the few-shot examples for the corresponding source code vulnerability.

20 Claims, 6 Drawing Sheets

CODE-CHANGE BASED PROMPT FOR CODE REPAIR

BACKGROUND

A source code bug is an error in a source code program that causes the program to behave in an unintended manner, such as producing erroneous results. There are various types of source code bugs. A functional bug is one where the program fails to perform in accordance with a functional description or specification. A compiler error is a type of software bug that fails to conform to the syntax of a programming language of the program. A runtime error occurs during runtime such as logic errors, I/O errors, undefined object errors, division by zero errors, etc.

A software vulnerability differs from source code bugs, such as functional bugs, compiler errors and runtime errors since they do not produce an erroneous result. By contrast, a software vulnerability is a programming defect that causes significant performance degradation, such as excessive resource usage, increased latency, reduced throughput, and overall degraded performance or is exploited for malicious intent. Software vulnerabilities are difficult to detect due to the absence of fail-stop symptoms. With the increased complexity of software systems, there is an emphasis on the efficient use of resources and system security and hence, improvements in detecting and remedying software vulnerabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A source code repair system generates a prompt including a few-shot examples of code changes made previously to correct a particular source code vulnerability. The prompt is given to a large language model to generate repair code for a source code snippet having the same vulnerability. Code changes made for a particular source code vulnerability, in the form of code diffs, are clustered into groups based on closely-related code changes. A select few of the code diffs in each group having a closest mean intra-cluster distance and mean nearest-cluster distance of each vector of the group are used as the few-shot examples for the prompt.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The present disclosure relates to the generation of a prompt to a large language model for the model to predict repaired source code to correct a software vulnerability having a known bug type. The prompt includes a few-shot examples of code changes used to fix the same vulnerability type previously and the software vulnerability. The few-shot examples guide the large language model to predict the correct output.

Code-changes made to correct known software vulnerabilities are clustered into groups. An encoding of the code changes and a corresponding natural language text description of the code change is used to cluster similar code changes into a group. Each group is related to a particular type of vulnerability. The most representative changes of each group are selected based on a silhouette analysis and used as the few-shot examples for the software vulnerability in the prompt.

A prompt is generated for a large language model to predict repaired code for the software vulnerability. In an aspect, the large language model is trained on source code and natural language text. The prompt is generated in a form of a conversation that includes instructions, the few-shot examples, and the software vulnerability. The large language model, given the prompt, generates repaired code that fixes the software vulnerability. In an aspect, the repaired code is in the code diff format showing the changes that need to be made to correct the original source code snippet.

Attention now turns to a more detailed description of the system, method, and components used in the source code repair system.

System

Figure 1:
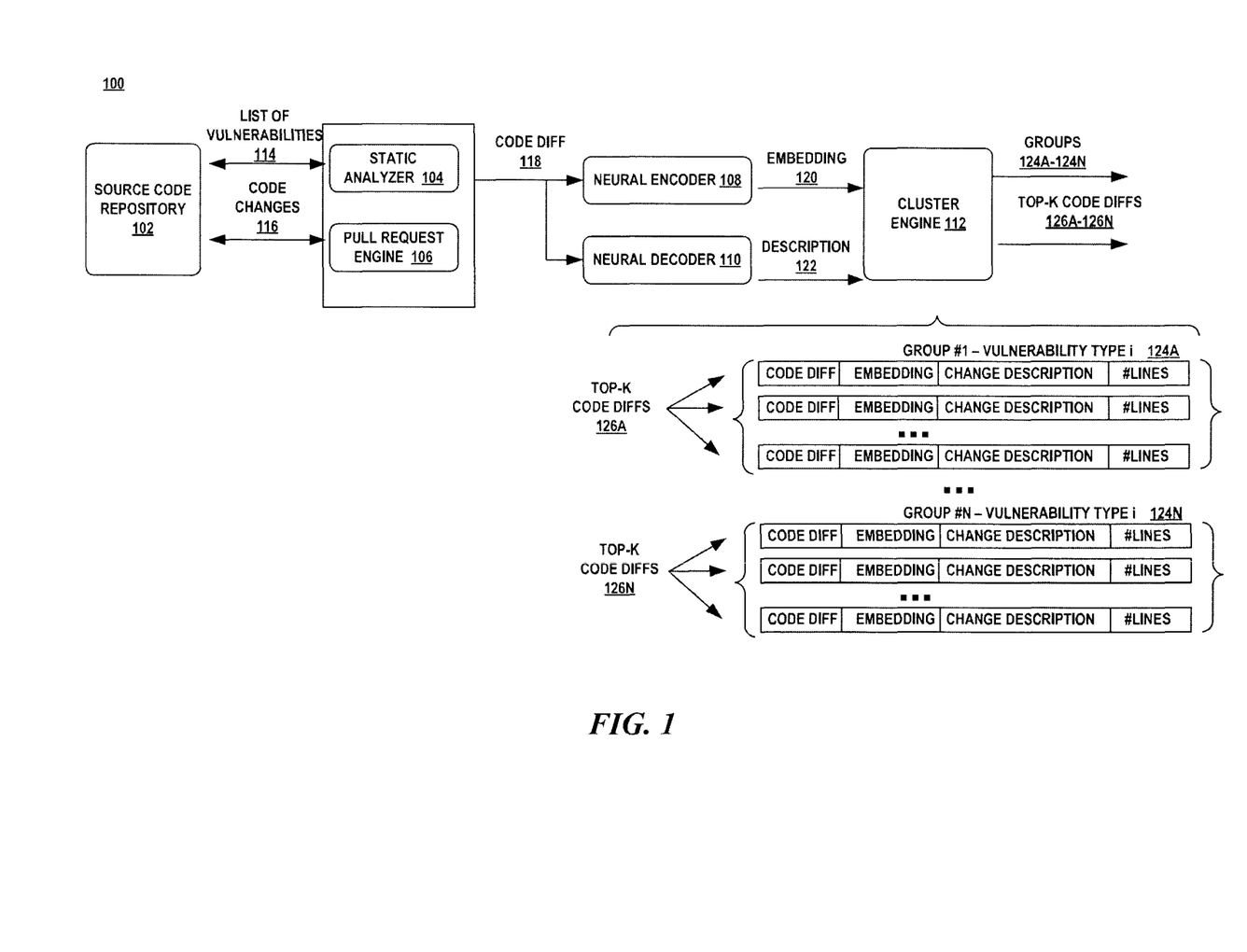
FIG. 1 is a schematic diagram illustrating the generation of the few-shot examples of similar code-changes for a software vulnerability type.

FIG. 1 illustrates an exemplary system for generating groups of similar code changes for a software vulnerability 100. In an aspect, the system 100 utilizes a source code repository 102, a static analyzer 104, a pull request engine 106, a neural encoder 108, a neural decoder 110, and a cluster engine 112.

A source code repository 102 is a file archive and web hosting facility that stores large amounts of artifacts, such as source code files and a code base. Programmers (i.e., developers, users, end users, etc.) often utilize a shared source code repository 102 to store source code and other programming artifacts that can be shared among different programmers. A programming artifact is a file that is produced from a programming activity, such as source code, program configuration data, documentation, and the like. The shared source code repository 102 may be configured as a source control system or version control system that stores each version of an artifact, such as a source code file, and tracks the changes or differences between the different versions. Repositories managed by source control systems are distributed so that each user of the repository has a working copy of the repository. The source control system coordinates the distribution of the changes made to the contents of the repository to the different users.

The static analyzer 104 discovers software vulnerabilities over a codebase or source code repository. The static analyzer 104 does not execute the source code to discover the software vulnerability instead relies on a static analysis. Examples of a static analyzer include, without limitation, Infer, CodeQL, source code security analyzers (i.e., BASH, dotTEST, etc.), and the like. A compiler differs from a static analyzer since the compiler detects syntax errors which differ from a software vulnerability.

There are various types of vulnerabilities, such as, cybersecurity vulnerabilities listed in the Common Vulnerability and Exposures database of the National Institute of Standards and Technology, SQL injections and cross-site scripting vulnerabilities, network vulnerabilities that govern the flows of data workloads, user traffic and computing requests, and the like.

Facebook® Infer is an interprocedural static code analyzer that is based on separation logic that performs Hoare-logic reasoning about programs that mutate data structures. Infer uses the analysis language, Smallfoot Intermediate Language (SIL), to represent a program in a simpler instruction set that describes the program's actions on a symbolic heap. Infer symbolically executes the SIL commands over a symbolic heap according to a set of separation logic proof rules in order to discover program paths with the symbolic heap that violate heap-based properties. Infer discovers software vulnerabilities consisting of null pointer exceptions, resource leaks, annotation reachability, missing lock guards, and concurrency race conditions.

It should be noted that SIL differs from intermediate languages, such as CIL, that represent instructions that can be transformed into native code. SIL instructions are used for a symbolic execution which is a logic-based proof analysis. The SIL instructions are not constructed to be executed on a processor or CPU such as the CIL instructions.

CodeQL is a static analysis tool that runs on a codebase or repository. CodeQL creates a CodeQL database for the codebase and contains information on each code's syntactic structure, data flow, and control flow. CodeQL monitors the compilation process of a codebase and extracts information about the code, such as, the syntactic data from an abstract syntax tree of each code, and semantic data about name binding and type information. A set of queries is run on the CodeQL database to search for these artifacts from the database. Each query or group of queries is written to identify patterns of specific vulnerability types. A list of code errors or vulnerabilities within that codebase is generated from the queries. CodeQL identifies software vulnerabilities, such as null dereference, uninitialized variables, hardcoded credential, and SQL injections.

The static analyzer 104 generates a list of software vulnerabilities 114 found in each source code file of the source code repository 102. The pull request engine 106 obtains the pull request containing the changes made to a source code program that corrects the vulnerability identified by the static analyzer. The pull request includes the code changes 116 in a code diff format. A code diff 116 is data comparison between two files output by a diff tool or two versions of the same file. The differences are displayed in a standard format referred to as the code diff or diff format.

The code diff format starts with a two-line header that includes a modification timestamp of the "from file" and a modification timestamp of the "to file." Thereafter, the code diff format includes hunks of differences where each hunk includes a first line indicating the altered line numbers as follows: @@ from-file-line-numbers to-file-line-numbers @@. Thereafter, the lines common to both files are prepended with a space character, lines added to the first file are prepended with a '+' character, and lines deleted from the first file are prepended with '-' character.

The code diff 118 is encoded into an embedding 120 using a deep learning encoder 108. A description of the code changes 122 is generated by a deep learning decoder 110 given the code diff of the code changes 118. In an aspect, the deep learning encoder 108 is an encoder neural transformer model with attention and the deep learning decoder 110 is a decoder neural transformer model with attention. An example of an encoder neural transformer model with attention includes the Bidirectional Encoder Representations from Transformers (BERT) model and an example of the decoder neural transformer model with attention includes a Generative Pre-trained Transformer (GPT) model. Other exemplary encoder models include OpenAI's neural encoder models, Huggingface's neural encoder models, or Microsoft's neural encoder models. Other exemplary decoder models include OpenAI's Codex model, Meta's Large Language Model Meta AI (LLaMA), and Microsoft's neural decoder models.

The encoder neural transformer model with attention is pre-trained on an unsupervised dataset of natural language text and source code snippets using a masked language model objective. The masked language model randomly masks some of the tokens from the input and the object is to predict the original vocabulary of the masked token based on its context. The masked language model objective enables the embedding representation to fuse the left and right context, hence the bidirectional nature of the embedding representations.

A deep learning machine learning model differs from traditional machine learning models that do not use neural networks. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes statistical techniques, data mining, Bayesian networks, Markov models, clustering, support vector machine, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. There are various types of deep learning models that generate source code, such as recurrent neural network (RNN) models, convolutional neural network (CNN) models, long short-term memory (LSTM) models, and neural transformers.

A neural transformer model with attention utilizes an attention mechanism. Attention is used to decide which parts of the input sequence are important for each token/subtoken, especially since the encoder is limited to encoding a fixed-size vector. Attention mechanisms gather information about the relevant context of a given token/subtoken and then encode that context into a vector which represents the token/subtoken. It is used to identity the relationships between subtokens in the long sequence while ignoring other subtokens that do not have much bearing on a given prediction.

The attention mechanism indicates how much attention a particular input should pay to other elements in a given input sequence. The attention mechanism can be implemented in a self-attention layer of the model. In the self-attention layer, each token in an input sequence is transformed into a query (Q), key (K), and value (V) that are used to calculate a score that indicates how much attention that particular token should attend to other tokens in the input sequence. The self-attention layers are integrated into both an encoder neural transformer model with attention and a decoder neural transformer model with attention.

The attention mechanism used in an encoder neural transformer model with attention is a self-attention layer that precedes the neural network layer. The self-attention layer attends to both the right and left of the token being calculated. The decoder neural transformer model with attention has a masked self-attention layer that precedes the neural network layer. The masked self-attention layer masks tokens to the right of the token being calculated.

The cluster engine 112 uses the code diff embedding 120 and the code changes description 122 to generate a vector representing the code changes. The vectors of each code change are then clustered for each vulnerability type into a group that represents similar code changes. There may be several groups for a particular vulnerability type. In an aspect, k-means clustering is used to form the groups 124A-124N.

Silhouette analysis is then used to select the top-k code diffs representative of a group 126A-12N. Silhouette analysis determines how similar a vector is to the other vectors in a group. Each vector is given a silhouette value that measures how similar the vector is to the group. A high value indicates that the vector is well-matched to the other vectors in the group. The silhouette value may be based on any distance measure, such as Euclidean distance or Manhattan distance. The vectors having the top-k silhouette values are selected as representative data points of a group, where k is a pre-configured value.

As shown in FIG. 1, there are several groups 124A 124N with each group associated with a particular software vulnerability. There may be several groups for a particular software vulnerability. Each group includes several data points, where each data point includes a code diff, the associated code diff embedding (embedding), code change description (change description), and number of changed lines. The top-k code diffs are identified for each group 126A-126N.

Attention now turns to a further discussion of the source code repair code system. Turing to FIG. 2, there is shown an exemplary system 200 for the generation of a prompt to a large language model to produce repaired code 217. The system 200 includes a static analyzer 202, a prompt generator 204, a collection of groups 206, and a large language model 208. The static analyzer 202 analyzes a source code program for software vulnerabilities as discussed above. The static analyzer 202 identifies a software vulnerability of a particular vulnerability type and produces a warning message. The prompt generator 204 receives the vulnerable code snippet 210 and vulnerability type 212 and uses the vulnerability type to obtain the top-k code diffs 214 from each group 206 associated with the vulnerability type. The prompt generator 204 generates a prompt 216 that includes the top-k code diffs or few-shot examples 214, the vulnerable code snippet 210 and instructions. The prompt 216 is transmitted to the large language model 208 which predicts repaired code 218.

Figure 2:
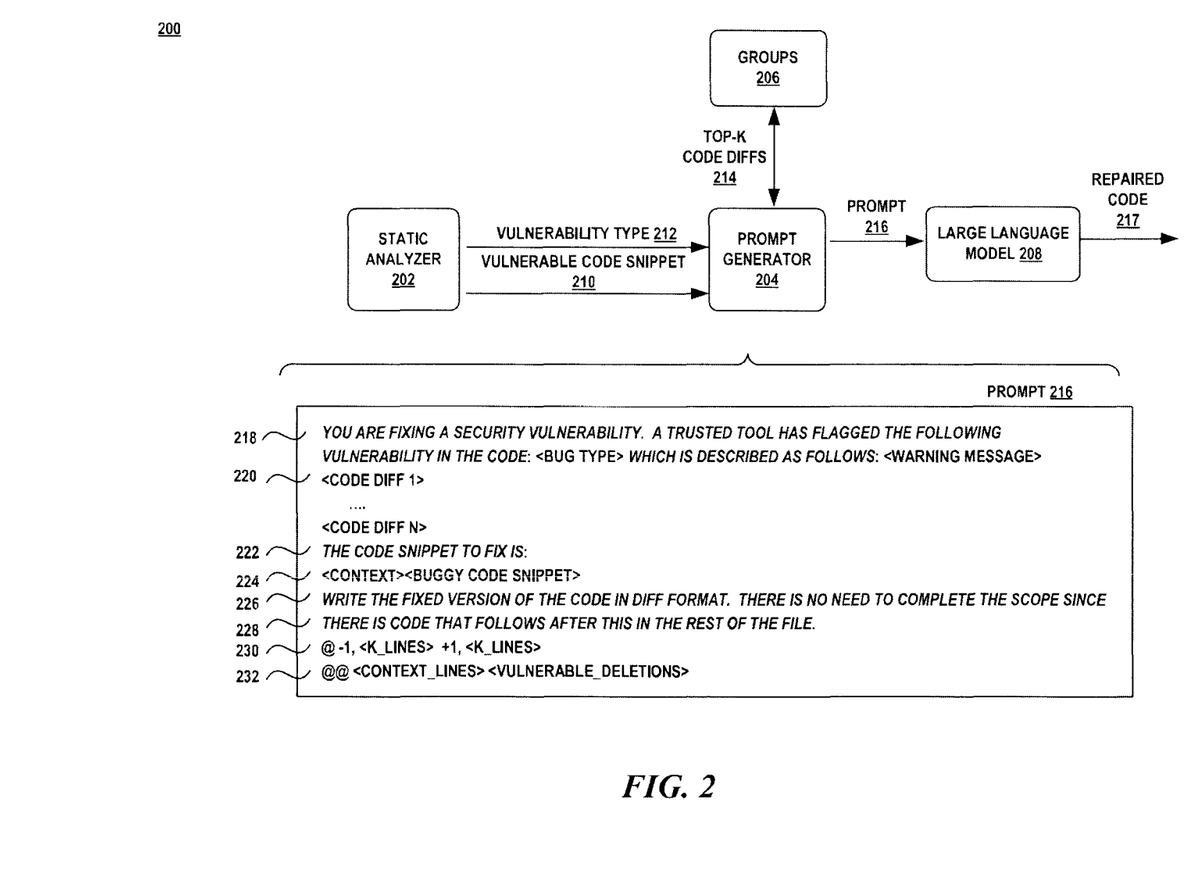
FIG. 2 is a schematic diagram illustrating the generation of a prompt to a large language model to obtain repaired code.

In an aspect, the prompt 216 may include a first instruction 218 that describes the task the large language model is to perform. In the exemplary prompt 216, the first instruction 218 is as follows: YOU ARE FIXING A SECURITY VULNERABILITY. A TRUSTED TOOL HAS FLAGGED THE FOLLOWING VULNERABILITY IN THE CODE: <BUG TYPE> WHICH IS DESCRIBED AS FOLLOWS: WARNING MESSAGE>. The <BUG TYPE> is the software vulnerability identified by the static analyzer and <WARNING MESSAGE> is the message output from the static analyzer.

Thereafter, the top-k code diffs 220 selected from the clustered groups 206 is then input into the prompt along with the source code snippet with the vulnerability and its context 224. The context is the source code surrounding the source code snippet and may include the immediately preceding source code, the source code immediately following the source code snippet or a combination thereof.

A second instruction 222 follows which describes the task that the large language model is to perform which includes the format of the output 226-232, which is in code diff format. The output format includes the average number of lines that the repaired code should contain as the variable k_lines 230. The value k_lines 230 is the median value of the number of changed lines over all the changed lines of a group. The number of lines is included in the prompt in order for the model to know how many lines of changes has typically been seen in the prior examples.

The large language model is a deep machine learning model that contains billions of parameters. Parameters are the parts of the model learned from the training datasets that define the skill of the model to generate predictions for a target task. In an aspect, the large language model is a unified cross-modal neural transformer model with attention. A unified cross-modal neural transformer model with attention is a type of neural transformer model that is pre-trained on multi-modal contents, such as natural language text and source code to support various code-related tasks. The large language model may be implemented as a neural transformer model with attention in an encoder-decoder configuration or in a decoder-only configuration.

In an aspect, the large language model may be hosted in a remote server whose access is offered as a service where access to the large language model may be given through application programming interfaces (APIs). Examples of the large language model include the Chat GPT model of OpenAI or other GPT models, as described above, that are offered as a service.

Attention now turns to a more detailed discussion of the application of the source code repair system.

Figure 3A:
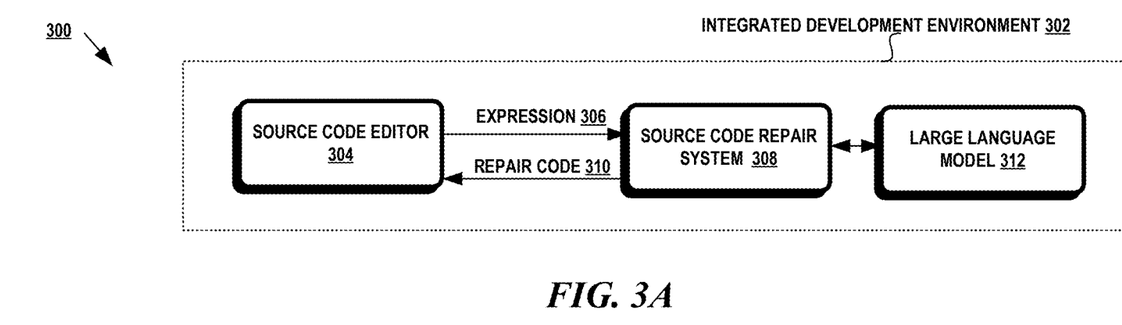
FIGS. 3A-3B are schematic diagrams illustrating exemplary applications of the source code repair system.
Figure 3B:
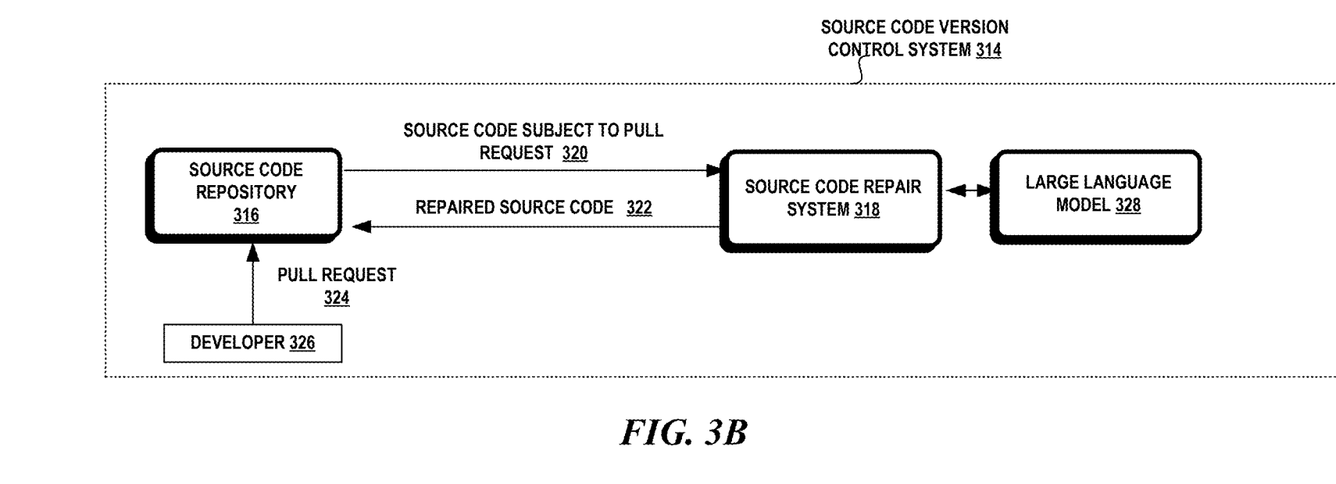

FIGS. 3A and 3B illustrate exemplary systems utilizing the source code repair system. Turning to FIG. 3A, there is shown a system 300 where the source code repair system 308 operates within an Integrated Development Environment (IDE) 302. The IDE 302 is a software development tool that provides tools for software development, such as without limitation, source code editors, compilers, debuggers, build automation tools, and the like. The IDE 302 may incorporate a source code editor 304 that interacts with a developer to generate or edit source code. The source code repair system 308 may operate as a background process that monitors the source code input into the source code editor 304. At various times during the development, the source code repair system may receive source code snippets as expressions 306 extracted from the source code editor 304. The expressions 306 are analyzed by the static analyzer as explained above to identify any software vulnerabilities in the source code under development. Upon detection of such a software vulnerability, the source code repair system 308 constructs a prompt, as discussed above, that is sent to the large language model 312 for repaired code. The source code repair system 308 notifies the source code editor 304 that the expression may be a software vulnerability and provides repaired code 310 without the software vulnerability.

FIG. 3B illustrates a source code repair system 318 that operates within a source code version control system 314 to identify vulnerabilities in the source code of a pull request 324 submitted by a developer 326. A source code repository 316 detects a pull request 324 and initiates a request 320 for the source code repair system 318 to analyze the source code subject to the pull request 324 for a software vulnerability. The source code repair system 318 utilizes the static analyzer, as discussed above, to detect a software vulnerability. If a software vulnerability is found, the source code repair system generates a prompt, as discussed above, which is transmitted to the large language model 328 for repaired source code. The system 318 notifies the source code repository 316 of the vulnerability and returns the repaired source code 322.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
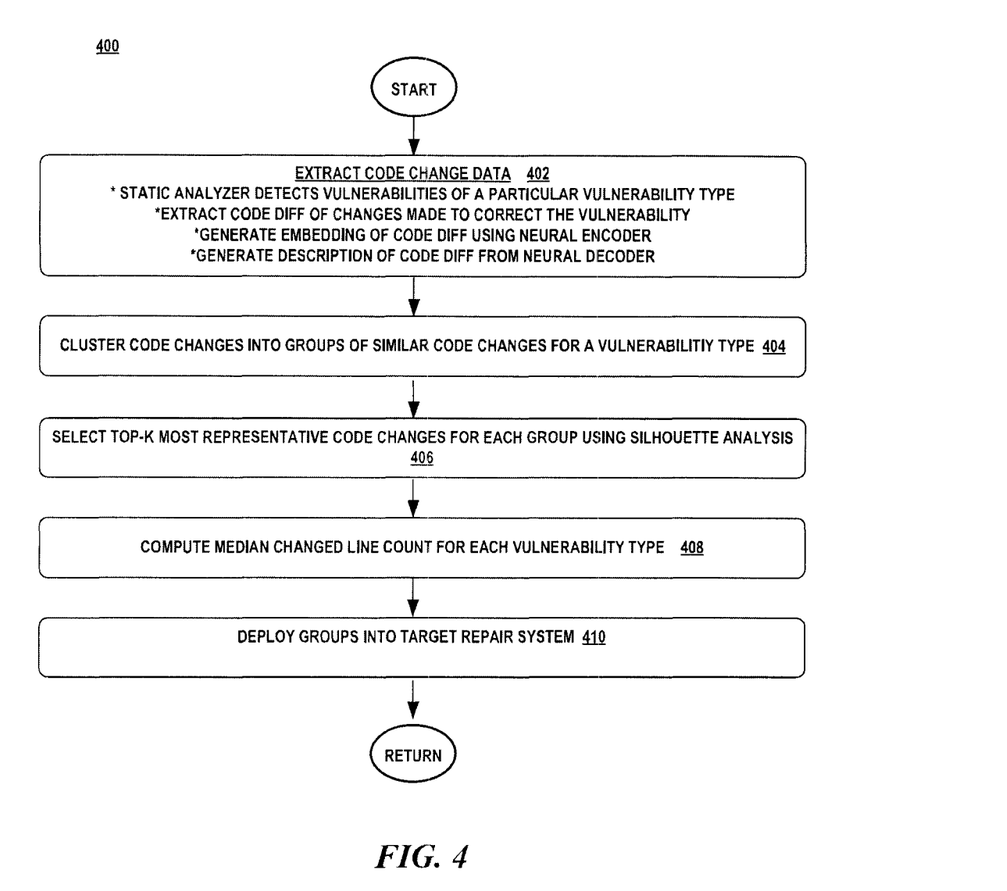
FIG. 4 is a flow diagram illustrating an exemplary method of the source code repair system.

FIG. 4 illustrates an exemplary method of the source code repair system 400. Initially, the groups are formed prior to the operation of the target vulnerability repair system.

The groups are formed by finding code changes made to correct a particular vulnerability. A static analyzer is used to detect a vulnerability in source code. The static analyzer analyzes a program and indicates the vulnerability type of any detected vulnerability. The pull request engine extracts the code diff of the changes made to correct the vulnerability. A neural encoder is given the code diff and generates a corresponding embedding. The code changes are given to a neural decoder which generates a natural language description of the code changes. (Collectively, block 402).

Each datapoint which includes a code diff embedding and corresponding natural language description of the code changes is clustered to form groups of similar code changes for a particular vulnerability type. In an aspect, the k-means clustering method is used. The k-means clustering method forms groups based on a mean or center centroid value of the code diff embedding and the code change description. The k-means clustering method partitions n datapoints into $k \leq n$ sets $S=\{S1, S2, \ldots, Sk\}$ given a set of datapoints (x1, x2, ..., xn), where each datapoint is represented by the vector containing the code diff embedding and code change description, so as to minimize the variance between vectors. The k-means clustering method minimizes the Euclidean distance between datapoints and the center of the cluster to which the datapoint belongs. It should be noted that other clustering techniques may be used, such as Gaussian mixture models, Density-Based Clustering Algorithm (DBSCAN), and the like. (Collectively, block 404).

For each group, the top-k code diffs that represent a group are selected. Silhouette analysis is used to determine the code diffs closest to the mean value of the group. A silhouette is based on how close or distant a vector is to the mean value of the group. A silhouette value is calculated for each vector of the group, where the vector includes the embedding of the code diff and the description of the code changes. The silhouette value is computed using the mean intra-cluster distance a and the mean nearest-cluster distance b for each vector, which is the distance between a vector and the nearest cluster that the vector is not part of. The calculation is represented mathematically as (b−a)/max (a, b). The silhouette values range from −1 to 1. The k vectors having the highest scores are selected to represent the group, where k is a user-defined value. (Collectively, block 406).

For each group associated with a particular vulnerability type, the median value of the number of changed lines is computed from all the code diffs in all the groups associated with the vulnerability type. This median value is then used in the prompt to guide the large language model towards the expected length of the output. (Collectively, block 408).

Upon formation of the groups, the groups are then deployed to a target source code repair system (block 410).

Figure 5:
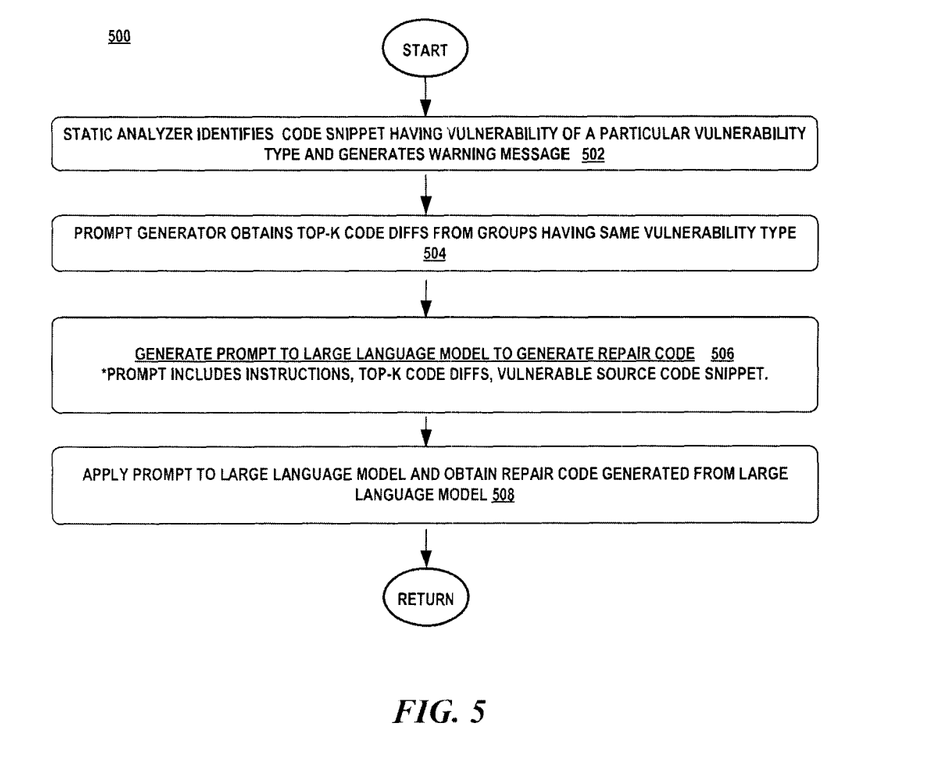
FIG. 5 is a flow diagram illustrating an exemplary method for generating the prompt to a large language model for repaired code.

Attention now turns to a discussion of the inference phase where the source code repair system generates a prompt for a large language model to predict the repaired code. Turning to FIG. 5, there is shown an exemplary method 500 for constructing a prompt for a large language model to generate repaired code.

A static analyzer identifies a vulnerability in a code snippet of a particular vulnerability type with a warning message (block 502). The prompt generator obtains from the clustered groups the top-k code diffs of each group associated with the vulnerability type (block 504). The prompt generator then generates a prompt including instructions, the top-k code diffs, the vulnerable code and associated context (block 506). The prompt is applied to the large language model which returns a predicted repaired code in the code diff format (block 508).

Technical Effect/Improvement

Aspects of the subject matter disclosed herein pertain to the technical problem of generating a prompt to guide a pre-trained large language model to predict repair code for a source code snippet having a known vulnerability type. The pre-trained large language model is trained on natural language text and source code but not trained on the repair code generation task. The prompt includes a few-shot examples, in the form of code diffs, that illustrate the repair code generation task to guide the large language model to generate the correct output.

The technical features associated with addressing this problem is the few-shot examples included in the prompt which are based on code changes made to correct the same vulnerability type. The technical effect achieved is the avoidance of fine-tuning the large language model on the repair code task without losing the accuracy of the results.

The creation of the groups of the few-shot examples for each vulnerability type consumes a considerable amount of computing resources and time. The inference phase of the source code repair system in a target system has to perform within tight timing requirements in order to be viable in the target system. For at least these reasons, the creation of the groups and the inference stage performed by the source code repair system needs to be performed on a computing device. Hence, the operations performed are inherently digital. A human mind cannot interface directly with a CPU, or network interface card, or other processor, or with RAM or digital storage, to read and write the necessary data and perform the necessary operations and processing steps taught herein.

Embodiments are also presumed to be capable of operating "at scale", that is capable of handling larger volumes, in production environments or in testing labs for production environments as opposed to being mere thought experiments.

The technique described herein is a technical improvement over prior solutions where the example selection was manually hand-picked or used a hard-coded list of examples. The technique described herein can be used in a dynamic setting without requiring handpicked examples.

Exemplary Operating Environment

Figure 6:
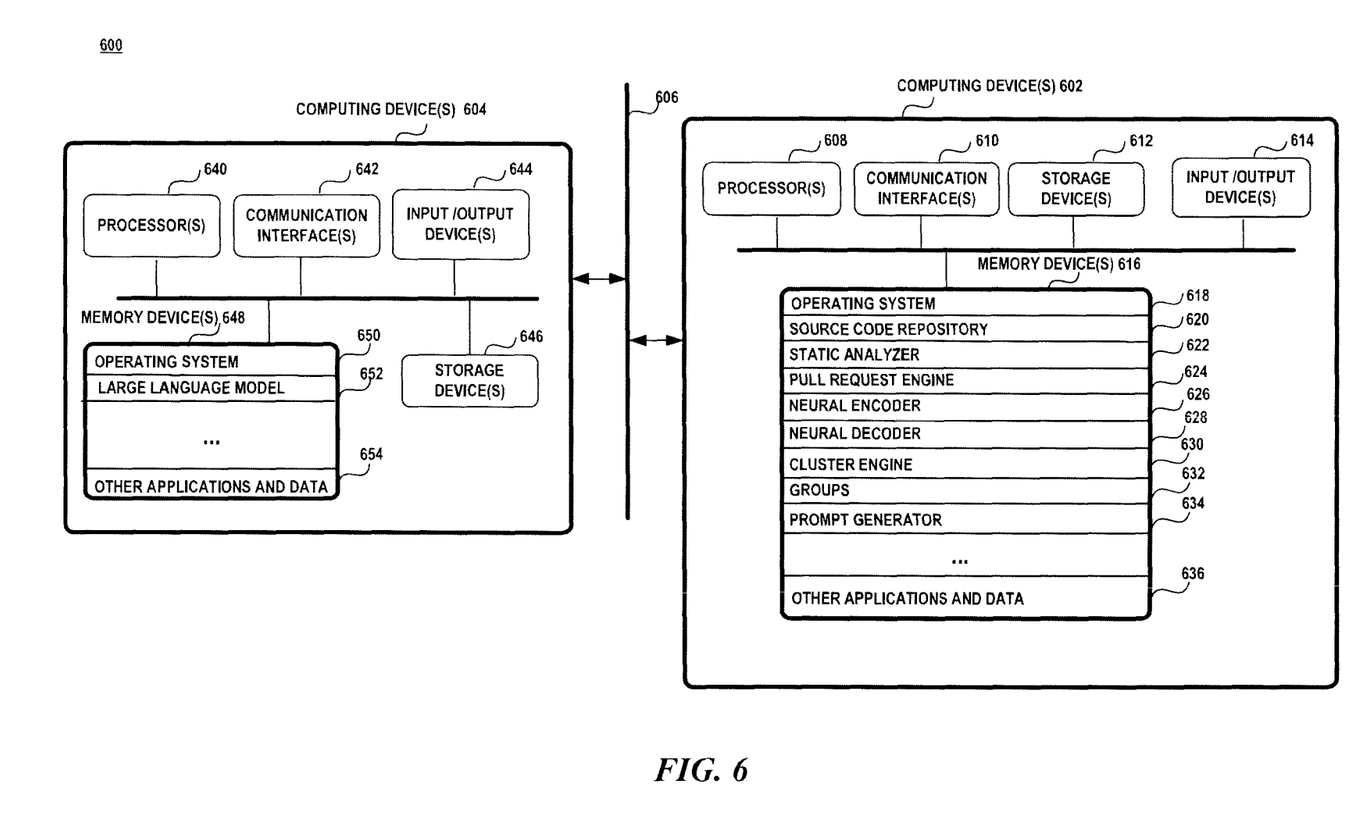
FIG. 6 is a block diagram illustrating an exemplary operating environment.

Attention now turns to a discussion of an exemplary operating environment 600. FIG. 6 illustrates an exemplary operating environment 600 having one or more computing devices 602, 604 communicatively coupled to a network 606. In one aspect, the construction of the groups and the prompt may be processed on one computing device 602 and the large language model may be hosted as a service on a second computing device 604. In another aspect, the construction of the groups, the creation of the prompt and the large language model may be hosted on the same computing device. The aspects of the operating environment are not constrained to a particular configuration.

The computing devices 602, 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

A computing device 602, 604 may include one or more processors 608, 640 one or more communication interfaces 610, 642, one or more storage devices 612, 646, one or more input/output devices 614, 644, and one or more memory devices 616, 648. A processor 608, 640 may be any commercially available or customized processor and may include dual microprocessors and multi-processor architectures. A communication interface 610, 642, facilitates wired or wireless communications between the computing device 602, 604 and other devices. A storage device 612, 646 may be computer-readable medium that does not contain propagating signals, such as modulated data signals transmitted through a carrier wave. Examples of a storage device 612, 646 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612, 646, in a computing device 602, 604. The input/output devices 614, 644 may include a keyboard, mouse, pen, voice input device, touch input device, display, speakers, printers, etc., and any combination thereof.

A memory device 616, 648 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 616, 648 may also include one or more external storage devices or remotely located storage devices that do not pertain to propagated signals, such as modulated data signals transmitted through a carrier wave.

The memory device 616, 648 may contain instructions, components, and data. A component is a software program that performs a specific function and is otherwise known as a module, program, component, and/or application. The memory device 616 may include an operating system 618, a source code repository 620, a static analyzer 622, a pull request engine 624, a neural encoder 626, a neural decoder 628, a cluster engine 630, one or more groups 632, a prompt generator 634, and other applications and data 636. Memory device 648 may include an operating system 650, a large language model 652, and other applications and data 654.

The computing devices 602, 604 may be communicatively coupled via a network 606. The network 606 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 606 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising: one or more processors; and a memory that stores one or more programs that are configured to be executed by the one or more processors. The one or more programs including instructions that perform acts to: obtain a source code snippet having a vulnerability of a vulnerability type; obtain a few-shot example associated with the vulnerability type, wherein the few-shot example represents code changes made to correct the vulnerability of the vulnerability type; generate a prompt for a large language model to generate repaired code that corrects the vulnerability in the source code snippet, wherein the prompt includes the few-shot example and the source code snippet having the vulnerability; provide the prompt to the large language model; and receive the repaired code from the large language model.

In an aspect, the few-shot example includes a code diff of the code changes made to correct the vulnerability. In an aspect, the prompt includes an instruction that directs the large language model to generate the repaired code. In an aspect, the prompt includes an instruction that directs the large language model to output the repaired code in a code diff format. In an aspect, the prompt includes a context of the source code snippet. In an aspect, the large language model is a decoder-only neural transformer model with attention. In an aspect, the large language model is a neural transformer model with attention pre-trained on natural language text and source code.

A computer-implemented method is disclosed, comprising: providing a group having a plurality of code changes made to correct a first type of software vulnerability; obtaining a source code snippet having a vulnerability of the first type of software vulnerability; selecting at least one code change from the group associated with the first type of software vulnerability; generating a prompt for a large language model to generate repaired code to correct the vulnerability of the source code snippet, wherein the prompt includes the source code snippet having the vulnerability and the selected at least one code change; and obtaining from the large language model the repaired code given the prompt.

In an aspect, the computer-implemented method further comprises: extracting a first code change of the plurality of code changes used to correct the first type of software vulnerability from a source code repository; and clustering the first code change of the plurality of code changes and the description of the first code change into a group having closely related code changes. In an aspect, the computer-implemented method further comprises: identifying the vulnerability of the first type of vulnerability through static analysis of the source code snippet.

In an aspect, the computer-implemented method further comprises: generating an embedding of the first code change; generating a description of the first code change; and clustering the embedding of the first code change and the description of the code changes into a similar group, wherein the similar group is based on similar code change embeddings and code change descriptions.

In an aspect, selecting the at least one code change from the group associated with the first type of software vulnerability further comprises: choosing the at least one code change from the group based on a closest distance to a mean value of the group. In an aspect, the prompt includes a context of the source code snippet. In an aspect, the prompt includes an instruction that describes an output format of the code changes, wherein the output format includes a code diff format. In an aspect, the large language model is a neural transformer model with attention.

A computer-implemented method is disclosed, comprising: obtaining a group comprising a plurality of code diffs associated with a first type of a software vulnerability, wherein a code diff of the plurality of code diffs is associated with a vector comprising an embedding of a respective code diff and a description of the respective code diff; choosing a select one of the code diffs of the group based on a closest similarity of the vector of the select one of the code diffs to a mean intra-cluster distance and a mean nearest-cluster distance of each vector in the group; obtaining a source code snippet having a first type of vulnerability; creating a prompt for a large language model to generate repaired code for the source code snippet, wherein the prompt includes the source code snippet and the select one of the code diffs of a group associated with the first type of vulnerability; and obtaining repaired code for the source code snippet from a large language model given the prompt.

In an aspect, the computer-implemented method further comprises: generating the embedding of the respective code diff using an encoder neural transformer model with attention given the respective code diff. In aspect, the computer-implemented method further comprises: generating the description of the respective code diff using a decoder neural transformer model with attention given the respective code diff.

In an aspect, the prompt includes a context of the source code snippet and instructions that indicate an output format of the repaired code. In an aspect, the large language model includes a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
a processor; and
a memory that stores a program that is configured to be executed by the processor, the program comprising instructions that perform acts to:
obtain a source code snippet having a first type of software vulnerability;
access a plurality of groups having code changes, wherein a group of the plurality of groups is associated with a particular software vulnerability type, wherein a code change comprises a vector comprising an embedding of a respective code change and a natural language description of the respective code change, wherein each group of the plurality of groups comprises closely similar vectors;
associate with each group of the plurality of groups, at least one representative code change, wherein the at least one representative code change for a respective group comprises a vector having a closest mean intra-cluster distance to other vectors within the respective group;
select the at least one representative code change from the group of the plurality of groups associated with the first type of software vulnerability;
create an input to a large language model comprising the source code snippet having the first type of the software vulnerability and the at least one representative code change from the group of the plurality of groups associated with the first type of software vulnerability;
cause the large language model to generate repair source code for the source code snippet having the first type of software vulnerability given the input;

obtain the repair source code for the source code snippet from the large language model; and
output the repair source code.

2. The system of claim 1, wherein the input to the large language model further comprises a context of the source code snippet having the first type of software vulnerability.

3. The system of claim 1, wherein the program comprises instructions that perform acts to:
identify the first type of software vulnerability through static analysis of the source code snippet.

4. The system of claim 1, wherein obtain a source code snippet having a first type of software vulnerability further comprises:
receive the source code snippet having the first type of software vulnerability from a source code editor.

5. The system of claim 1, wherein obtain a source code snippet having a first type of software vulnerability further comprises:
receive the source code snippet having the first type of software vulnerability from a source code version control system.

6. The system of claim 1, wherein the vector for the at least one representative code change has a closest mean nearest-cluster distance to other groups.

7. The system of claim 1, wherein the code changes are represented in a code diff format.

8. A computer-implemented method, comprising:
accessing a plurality of groups having code changes, wherein a group of the plurality of groups is associated with a particular software vulnerability type, wherein a code change is associated with a vector comprising an embedding of a respective code change and a natural language description of the respective code change, wherein each group of the plurality of groups comprises code changes comprising similar vectors, wherein each group of the plurality of groups comprises a representative code change, wherein the representative code change comprises a closest mean intra-cluster distance to other code changes of the group;
obtaining a source code snippet having the first type of software vulnerability;
selecting one or more code changes from the group associated with the first type of software vulnerability based on a closest distance to the representative code change for the group;
generating an input to a large language model, wherein the input includes the source code snippet having the first type of vulnerability and the one or more code changes;
causing the large language model to generate repair code to correct the first type of software vulnerability, wherein the large language model is given the input; and
obtaining from the large language model the repair code.

9. The computer-implemented method of claim 8, further comprising:
identifying the first type of software vulnerability in the source code snippet from a static analysis of the source code snippet.

10. The computer-implemented method of claim 8, wherein the input to the large language model further comprises a context of the source code snippet having the first type of software vulnerability.

11. The computer-implemented method of claim 8, further comprising:
obtaining the source code snippet having the first type of software vulnerability from a source code editor.

12. The computer-implemented method of claim 8, further comprising:
obtaining the source code snippet having the first type of software vulnerability from a source code version control system.

13. The computer-implemented method of claim 8, wherein a code change is represented in a code diff format.

14. The computer-implemented method of claim 8, wherein the one or more code changes from the group associated with the first type of software vulnerability is based on a mean nearest-group distance.

15. A hardware storage device having stored thereon computer executable instructions that are structured to be executable by a processor of a computing device to thereby cause the computing device to perform actions that:
obtain a source code snippet having a first type of software vulnerability;
access a plurality of groups of code changes, wherein a group of the plurality of groups is associated with a particular software vulnerability type and comprises a plurality of code diffs, wherein a code diff of the plurality of code diffs represents a code change and is associated with a vector comprising an embedding of the code diff and a natural language description of the code diff;
associate with each group of the plurality of groups, at least one representative code diff for each group, wherein the at least one representative code diff for a respective group comprises a vector having a closest mean intra-cluster distance to other vectors within the respective group;
select the representative code diff from the group of the plurality of groups associated with the first type of software vulnerability;
create an input to a large language model comprising the source code snippet having the first type of the software vulnerability and the at least one representative code diff from the group of the plurality of groups associated with the first type of software vulnerability;
cause the large language model to generate repair source code for the source code snippet having the first type of software vulnerability given the input;
obtain the repair source code for the source code snippet from the large language model; and
output the repair source code.

16. The hardware device of claim 15, having stored thereon computer executable instructions that are structured to be executable by a processor of a computing device to thereby cause the computing device to perform actions that:
identify the first type of software vulnerability in the source code snippet from an interprocedural static analysis of the source code snippet.

17. The hardware device of claim 15, wherein the input to the large language model further comprises a context of the source code snippet having the first type of software vulnerability.

18. The hardware device of claim 15, having stored thereon computer executable instructions that are structured to be executable by a processor of a computing device to thereby cause the computing device to perform actions that:
cause the large language model to generate the natural language description of each code diff given each code diff.

19. The hardware device of claim 15, having stored thereon computer executable instructions that are structured to be executable by a processor of a computing device to thereby cause the computing device to perform actions that:
receive the source code snippet having the first type of software vulnerability from a source code editor or a source code version control system.

20. The hardware device of claim 15, wherein the at least one representative code diff for a respective group comprises a vector having a closest mean nearest-cluster distance to other groups.

* * * * *